United States Patent
Quick et al.

(10) Patent No.: US 8,606,279 B2
(45) Date of Patent: Dec. 10, 2013

(54) RADIO NETWORK COMMUNICATION SYSTEM AND PROTOCOL USING AN AUTOMATIC REPEATER

(75) Inventors: Ashleigh Glen Quick, Bowden (AU); Donald Murray Terrace, Bowden (AU)

(73) Assignee: Clipsal Integrated Systems Pty Ltd., Bowden (AU)

( * ) Notice: Subject to any disclaimer, the term of this patent is extended or adjusted under 35 U.S.C. 154(b) by 1019 days.

(21) Appl. No.: 10/567,574

(22) PCT Filed: Aug. 9, 2004

(86) PCT No.: PCT/AU2004/001052
§ 371 (c)(1),
(2), (4) Date: Feb. 8, 2006

(87) PCT Pub. No.: WO2005/015774
PCT Pub. Date: Feb. 17, 2005

(65) Prior Publication Data
US 2006/0256746 A1    Nov. 16, 2006

(30) Foreign Application Priority Data

Aug. 8, 2003    (AU) ................................. 2003904167

(51) Int. Cl.
*H04W 40/00*    (2009.01)
*H04B 1/10*    (2006.01)
*H04B 1/16*    (2006.01)

(52) U.S. Cl.
USPC ............................ 455/445; 455/310; 455/328

(58) Field of Classification Search
USPC .......................................... 370/445, 310, 328
See application file for complete search history.

(56) References Cited

U.S. PATENT DOCUMENTS

| | | | |
|---|---|---|---|
| 5,040,175 A | 8/1991 | Tuch et al. | |
| 5,796,738 A * | 8/1998 | Scott et al. | 370/401 |
| 5,898,679 A * | 4/1999 | Brederveld et al. | 370/315 |
| 5,978,383 A * | 11/1999 | Molle | 370/445 |
| 6,539,028 B1 * | 3/2003 | Soh et al. | 370/445 |
| 6,574,668 B1 | 6/2003 | Gubbi et al. | |
| 2002/0106011 A1 * | 8/2002 | Fujii et al. | 375/220 |
| 2002/0128986 A1 * | 9/2002 | Stutz | 705/401 |
| 2003/0108013 A1 * | 6/2003 | Hwang et al. | 370/335 |
| 2003/0227934 A1 | 12/2003 | White et al. | |
| 2004/0146013 A1 * | 7/2004 | Song et al. | 370/279 |

FOREIGN PATENT DOCUMENTS

| | | | | |
|---|---|---|---|---|
| JP | 2000-165937 | 6/2000 | | |
| JP | 2001-028566 | 1/2001 | | |
| JP | 2001-231078 | * 8/2001 | | H04Q 7/38 |
| JP | 2002-223188 | 8/2002 | | |
| WO | 01/78426 | 10/2001 | | |
| WO | 2004/034310 | 4/2004 | | |

OTHER PUBLICATIONS

English Language Abstract of JP 2001-231078.
U.S. Appl. No. 10/567,575 to Quick et al., filed Feb. 8, 2006.
U.S. Appl. No. 10/567,572 to Quick et al., filed Feb. 8, 2006.

* cited by examiner

*Primary Examiner* — Christopher M Brandt
*Assistant Examiner* — Muthuswamy Manoharan
(74) *Attorney, Agent, or Firm* — Greenblum & Bernstein, P.L.C.

(57) ABSTRACT

A radio frequency communications network system and protocol for allowing the dissemination of data to be shared by devices within a network. The invention is particularly useful when the devices are out of transmission range of each other. The network includes repeater devices located between the devices to manage a data transfer in the network. The invention also provides for data transfer management in the presence of collisions between conflicting data transmissions.

18 Claims, 3 Drawing Sheets

RADIO NETWORK COMMUNICATION SYSTEM AND PROTOCOL USING AN AUTOMATIC REPEATER

TECHNICAL FIELD

This invention relates to a network of devices which communicate with each other via radio frequency.

BACKGROUND OF THE INVENTION

A network of devices can be created by arranging a group of devices that communicate with each other via radio frequency (RF) means to transmit data between the devices. Provided that each of the devices is within the range of the maximum communications range of each device, each device can effectively communicate with each other device in the network.

In many such networks, the devices may all be transceivers, ie are each capable of both transmitting and receiving. For the purpose of transferring an item of data, one device acts predominantly as a transmitter while other devices act predominantly as receivers. In this context, transceivers, which act predominantly as transmitters will be referred to as transceiver/transmitters. Those which act predominantly as receivers will be referred to as transceiver/receivers.

The present invention is to be used in a "point to multipoint" system as opposed to a "point to point" system in which communications occur between only two devices at a time. In a point to multipoint communication system, communications occur between one device and two or more of the other devices in the network simultaneously.

A reliable "point to multipoint" communication system allows the creation of a shared network variable. This is a variable which is known to all of the devices in the network. For example, if one device wants to change the value of the shared network variable, it must transmit a request and be guaranteed that all devices receive and process the updated variable simultaneously. If the update cannot be made simultaneously, or not all other devices in the network receive the update, then the network does not have a shared network variable.

Shared network variables allow the creation of a network which has no central controller. All of the essential data about the operation and control of the network is known by each device in the network simultaneously. The data can be updated by any device in the network at any time and all other devices are guaranteed to update their data accordingly. This allows the control of devices within the network to be simplified, more flexible, and less costly when compared with networks having a central controller.

A single communication action between each of the devices is herein referred to as a Transaction. A Transaction occurs between a device (transceiver/transmitter) which transmits data to one or more transceiver/receivers of the data. The Transaction also includes data sent from the transceiver/receivers to the transceiver/transmitter as well as to each other of the transceiver/receiver devices in the network.

When transmitting to more than one transceiver/receiver simultaneously (also known as a broadcast or multicast), it is important to know that all transceiver/receivers have successfully received the data. If even one transceiver/receiver has not successfully received the data (for example because of a bit error causing data corruption in one transceiver/receiver), then all other transceiver/receivers must be informed that not all of the other transceiver/receivers have successfully received the data.

Such networks may use a transmission system with dominant and inferior bits. This means that if there is a conflict, and two devices simultaneously transmit a dominant and inferior bit, then when monitoring the communication medium, each device will see the transmission of the dominant bit. The device transmitting the inferior bit knows that there has been a conflict and can take whatever action is appropriate. For example, this may mean the cessation of all further transmissions.

In conventional point to point communication protocols, a general procedure is to have each device transmit an acknowledge statement some time after receipt of the data. This has the drawback that the transmitting device must know exactly the number of receiving devices within the network, and how to contact each of them. The reliable transfer of the same piece of data to multiple receiving devices requires many transmissions of the same data, and a corresponding wait for each transmission to be acknowledged. The repetitive transmission of the same data to many recipients wastes the available bandwidth of the communication medium. This approach also requires the transmitter to obtain and store data about exactly which receiving devices are to accept a given transmission. This approach allows the creation of a shared network variable, at the expense of unnecessary complexity and poor use of the available bandwidth of the communication medium.

Alternatively a point to multipoint transmission can be used to transfer data to many recipients simultaneously, without any acknowledgement being returned. This renders the data transfer unreliable, and the transmitter will not be able to determine whether all of the receiving devices have successfully received the data. Unreliable transfer of data means that a shared network variable cannot be created.

The situation is compounded when two or more devices are out of communications range of each other. As it will be appreciated, each device has a maximum transmitting range (determined by design factors, including but not limited to transmit power, receiver sensitivity, antenna type, and signal processing algorithms). Communications, and synchronising communications is made more complicated when some devices are outside the maximum range and therefore cannot communicate with each other.

It is an object of the present invention to provide a system and protocol for improving the communications between devices in an RF multicast communications system, particularly between devices which are disposed beyond the normal communications range of one or more of the other devices in the system.

SUMMARY OF THE INVENTION

According to a first aspect of the present invention, there is provided in a radio communication system including a first transceiver, a second transceiver and a repeater, the method including upon receiving data from one of either the first or second transceivers, the repeater transmits a repeat flag to cause the transceivers to suspend further action and then transmits the data received from the one of either the first or second transceivers and then transmits an overall status to cause the transceiver to resume further action.

According to a second aspect of the present invention, there is provided a method for transmitting and receiving data according to a frame for use in a network of devices including a first transceiver, a repeater, and at least one other transceiver, the method including transmitting, by the first transceiver, data for each of the at least one other transceivers in a first time slot of the frame, transmitting, by the repeater, a repeat flag in a second time slot of the frame, after the first time slot, and retransmitting, by the repeater, the data transmitted in the first time slot in a third time slot of the frame after the second time slot, and the repeater transmitting an overall status to the network in a last time slot after the third time slot.

According to a third aspect of the present invention, there is provided a radio communication system including a first transceiver, a second transceiver and a repeater, wherein upon receiving data from one of either the first or second transceivers, in a first time slot, the repeater transmits a repeater flag in a second time slot to cause the transceivers to suspend further action, and then in a third time slot transmits the data received in the first time slot, and the repeater transmits an overall status to all transceivers in a last time slot after the third time slot to cause the transceivers to resume normal action.

According to a fourth aspect of the present invention, there is provided a repeater for use in a radio communication system including at least two transceivers, wherein upon receiving data in a first time slot, the repeater transmits a repeat flag in a second time slot to cause the transceivers to suspend further action, and then transmits in a third time slot, data received in the first time slot, and then transmits in a last time slot, after the third time slot, an overall status to cause the transceivers to resume further action.

According to a fifth aspect of the present invention, there is provided a transceiver for use in a radio communication system including at least one other transceiver and a repeater, wherein upon receiving a repeat flag from the repeater, in a second time slot, the transceiver suspends further action until it receives from the repeater, in a third time slot, data that was originally transmitted by the at least one other transceiver in a first time slot, before the second time slot, and an overall status from the repeater in a last time slot, after the third time slot, after which the transceiver resumes normal action.

According to a sixth aspect of the present invention, there is provided a method for use in a radio communications system including at least a first transceiver, a second transceiver and a repeater, such that upon receipt of a data transmission from the first transceiver, the repeater re-transmits the data transmission from the first transceiver, wherein upon receipt of a data transmission from the second transceiver before the repeater completely receives or retransmits the data transmission from the first transceiver, the repeater transmits a data sequence instructing each transceiver to cease its respective transmission.

According to a seventh aspect of the present invention, there is provided a radio communications system including at least a first transceiver, a second transceiver and a repeater, such that upon receipt of a data transmission from the first transceiver, the repeater re-transmits the data transmission from the first transceiver, wherein upon receipt of a data transmission from the second transceiver before the repeater completely receives or re-transmits the data transmission from the first transceiver, the repeater transmits a data sequence instructing each transceiver to cease its respective transmission.

According to an eighth aspect of the present invention, there is provided a repeater for use in a radio communication system including at least a first transceiver and a second transceiver, such that upon receipt of a data transmission from the first transceiver, the repeater retransmits the data transmission from the first transceiver, wherein upon receipt of a data transmission from the second transceiver before the repeater completely receives or re-transmits the data transmission from the first transceiver, the repeater transmits a data sequence instructing each transceiver to cease its respective transmission.

According to a ninth aspect of the present invention, there is provided a transceiver for use in a radio communication system including at least one other transceiver and a repeater, such that upon receipt of a data transmission from the at least one other transceiver, the repeater re-transmits the data transmission from the at least one other transmitter and upon receipt of the data transmission from the transceiver before retransmitting the data transmission from the at least one other transceiver, the repeater transmits a data sequence instructing each transceiver to cease respective transmissions, wherein, upon receipt of the data sequence from the repeater, the transceiver will cease transmission.

DETAILED DESCRIPTION OF THE PREFERRED EMBODIMENT

Figure 1:
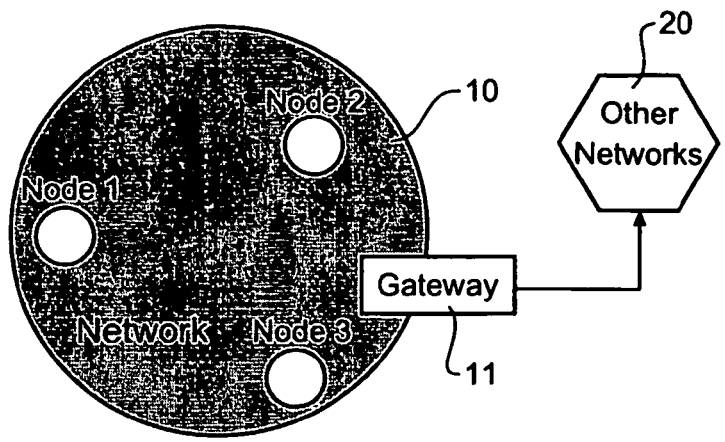
FIG. 1 shows one network architecture according to a preferred embodiment of the present invention.

An exemplary architecture of a network is shown in FIG. 1, in which the network 10 is made up from nodes 1, 2 and 3. Nodes 1, 2 and 3 are transceiving devices and may act as transmitters and/or receivers in a given communication Transaction. The network 10 may communicate with other networks 20, via gateway 11.

The protocol design of the present invention is based on the ISO seven layer model and some terminology is common with that used by ISO. The protocol used in the present invention is connectionless, meaning that once a single data transfer has taken place, there is no expectation of additional related data transfers either before or after.

Figure 2:
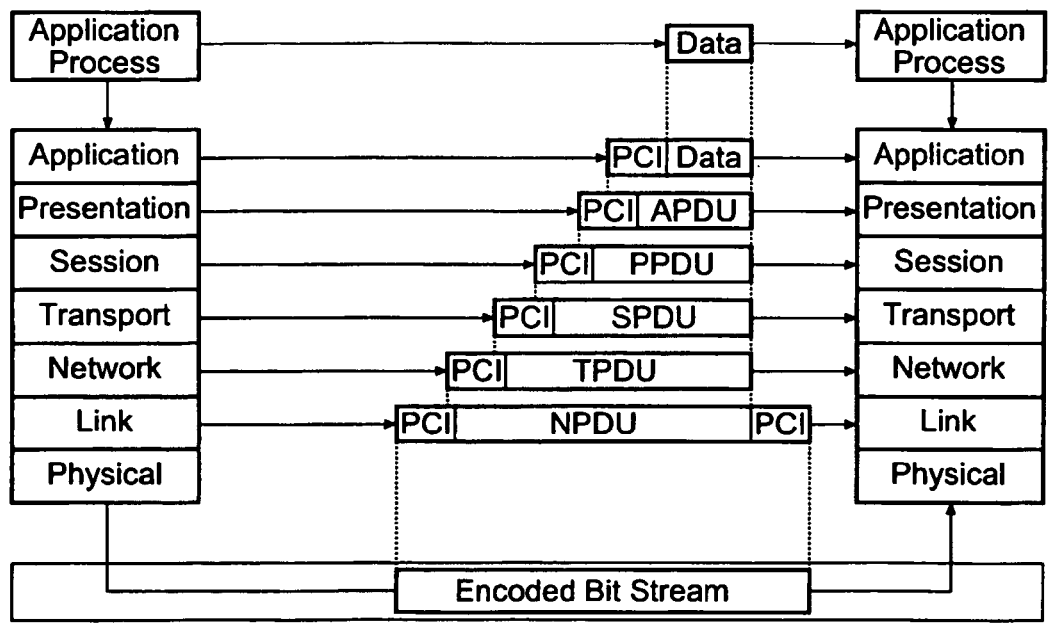
FIG. 2 shows the network protocol model used in the environment of the present invention.

The protocol model of the present invention is based on the ISO seven layer model and is shown in FIG. 2. For applications distributed over two nodes, each protocol layer has a virtual connection to the equivalent layer in the other node. As can be seen, each layer takes data provided by the layer above, treats it as a data unit and adds its own protocol control information (PCI) field. At each layer, the protocol data unit (PDU) is either the data, or a package provided by the next higher layer. The name of the PDU is prefixed by the layer to which it applies (For example, SPDU is a session PDU).

The physical layer relates to the mechanical and electrical network interface in the ISO system. In the system of the present invention, the physical layer refers to the hardware and firmware elements used to transmit and receive bits over the communication medium.

In the ISO system, the link layer is used for data link control (for example, framing, data transparency, error control). In the present invention, the link layer is used to break bytes up into bits, bit stuffing (if required), framing, collision detection, prioritisation, error detection, positive/negative acknowledge generation, checking, repeating and retransmission.

The network layer in the ISO system is used for networking routing, addressing, call set-up and clearing while in the present invention, the network layer is used for network routing, addressing, Transaction set-up and clear.

In the ISO system, the transport layer is used for end to end message transfer, connection management, error control, fragmentation and flow control. The transport layer is not used in the environment of the present invention.

The session layer in the ISO system is used for dialogue and synchronisation control for application entities but is not used in the environment of the present invention.

The presentation layer is used for transfer syntax negotiation, and data representation transformations in the ISO system while in the environment of the present invention, the presentation layer is used for optional encryption of application data.

The application layer in the ISO system is used for file transfer, access management, document and message interchange, job transfer and manipulation while in the environment of the present invention, the application layer supports sending and receiving application data.

Finally, the user application layer is used both in the ISO and the environment of the present invention for whatever is needed to achieve a specified function or behaviour.

It is predominantly in the link layer that the features of the present invention reside.

In the protocol of the present invention, use can optionally be made of a dominant bit, and an inferior bit. If two devices simultaneously transmit a dominant and an inferior bit, then receivers and transmitters (monitoring their own transmissions) will detect only the dominant bit.

Media access is obtained by a transmitter first monitoring the media, and if no existing transmission is detected, the transmitter will try to claim media access by transmitting a preamble stream. This preamble starts with at least one detectable bit. The claim for media access defines the start of a Transaction. A Transaction consists of all data transfer, acknowledgement and repeating of data. All nodes in a network must monitor the media continually and if they detect a Transaction occurring they will defer any attempt to claim media access until the completion of the current Transaction.

Transactions are asynchronous: they can occur at any time and the time difference from the start of one Transaction to the next does not have to be an integral number of bit periods.

Figure 3:
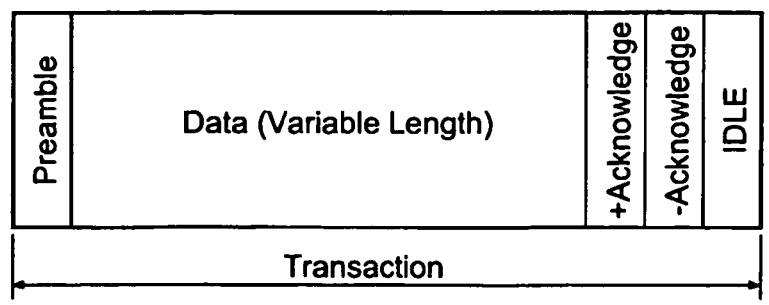
FIG. 3 shows a frame structure according to a preferred embodiment of the present invention.

In this application, a Transaction is specifically defined as a continuous period of time broken up into several sub-time slots containing different types of data. A Transaction will begin with a preamble for a set period of time, followed by the specific data which is to be transmitted from a transceiver/transmitter to two or more transceiver/receivers. The timeslot during which the data is transmitted is variable in length, and includes a portion used as a frame check sequence. Following the data transmission is a timeslot during which positive acknowledgement can be transmitted by the transceiver/receivers, followed by a timeslot during which negative acknowledgement is transmitted by the transceiver/receivers. The structure of this frame is shown in FIG. 3.

As described above, a Transaction is asynchronous and can start at any time. However, once started, the Transaction has a time-based structure. Special markers in the Transaction are used to show the beginning and end of the variable length data portion. The time slots during which the positive and negative acknowledgement are transmitted, are fixed in time. By coding and redundancy of data encoded into these timeslots, a positive acknowledgement by one or more transceiver/receivers and a negative acknowledgement by one or more transceiver/receivers can be conveyed. All of the devices involved in the Transaction see both of the acknowledgement timeslots.

Transceiver/receivers wishing to positively acknowledge, will transmit a special code during the positive acknowledge timeslot and during the negative acknowledge timeslot will either receive (if dominant bit transmission is not used) or transmit inferior bits (if dominant/inferior bits are used).

Similarly, transceiver/receivers wishing to negatively acknowledge will either transmit inferior bits (if dominant/inferior bits are used) or receive (if dominant bit transmission is not used) during the positive acknowledge timeslot and transmit a special code during the negative acknowledge timeslot.

The fact that the devices monitor the timeslots they are not transmitting, means that by the end of two acknowledge timeslots each device has detected either positive acknowledges, negative acknowledges or both and can therefore work-out the overall acknowledge state of the network.

For example, the transceiver/receiver which transmits a positive acknowledge will be able to detect some other transceiver/receiver which transmits a negative acknowledge. For the case where dominant bits are used, the transceiver/receiver positive acknowledging will attempt to transmit inferior bits during the negative acknowledge timeslot but will detect dominant bits due to the other transceiver/receiver which is simultaneously transmitting an appropriate code during the negative acknowledge timeslot. For the case where dominant bits are not used, the transceiver/receiver positive acknowledging will receive during the negative acknowledge timeslot and detect any bits due to the other transceiver/receiver which is transmitting an appropriate code during the negative acknowledge timeslot. The reverse case applies for the transceiver/receiver transmitting a negative acknowledge.

At the end of the Transaction, all devices do not know how many positive or negative acknowledges there were, all they have to know is that there were some positive and some negative.

If there were any negative acknowledges at all during the Transaction, then all of the transceiver/receivers know this, and can discard the data received. Similarly, the transceiver/transmitter knows this and can attempt to re-run the Transaction.

The generation of a positive acknowledge will be as follows. Upon receiving data, a node will generate a positive acknowledge only when:
  the data timeslot has been checked against its embedded frame check sequence and found to be valid; and
  any addressing information present in the data timeslot matches an addressing information used by the device.

Each device transceiver generally contains at least two different types of address, as follows:
  A Unit Address, allowing the device to be uniquely addressed in isolation; and
  A Multicast address, allowing those devices in a network to be addressed simultaneously for the purpose of updating shared network variables.

In addition, devices can also optionally contain:
  A Network Address, allowing physical devices to be grouped by the logical network to which they are allocated.

Other variations are possible, but these three address types are used as the basis for other more sophisticated addressing schemes.

The processes involved in generation of a negative acknowledge are as follows. A receiving device (transceiver/receiver) will generate a negative acknowledge only if the data timeslot is determined to be corrupted, by checking the received data using the embedded frame check sequence.

Where a device determines data timeslot corruption, there is no point further examining any fields inside the data timeslot.

Acceptance of the data transmitted by the transceiver/transmitter is only made by the transceiver/receivers if the condition for generation of a positive acknowledge are met and if no other transceiver/receiver has generated a negative acknowledge. This ensures that all transceiver/receivers receive a given message only once. For point-multipoint messages, this may mean that a message is discarded by a transceiver/receiver, even if it appears valid and was positively acknowledged.

The above describes the general environment in which the present invention can be utilised. The sequences described above can only be used when each device is within range of the other. It will be understood that each device will have a maximum transmitting range, beyond which it cannot communicate with other devices. The maximum transmitting range is determined by design factors, including but not limited to transmit power, receiver sensitivity, antenna type, and signal processing algorithms. For short range (unlicensed) devices, the range is typically from tens to, at most, several hundred meters. In the case where one or more devices are located beyond the maximum transmitting range of another device (ie cannot communicate with that device directly), difficulties in implementing the above-described procedure will be encountered. Particularly, in the case where a transceiver/transmitter transmits data, some or all of the other transceivers/receivers will not receive the data from that particular transceiver/transmitter and accordingly, will make it impossible to update shared network variables.

In accordance with an aspect of the present invention, the protocol described above (and subject of a co-pending patent application) is modified to allow the retransmission of data between devices so as to extend the effective transmission range of the devices used in the network. The modified protocol is used in conjunction with a repeater which is placed roughly in the geometric centre of devices in the network and acts as a relay between devices distributed beyond their normal transmission range.

Figure 4:
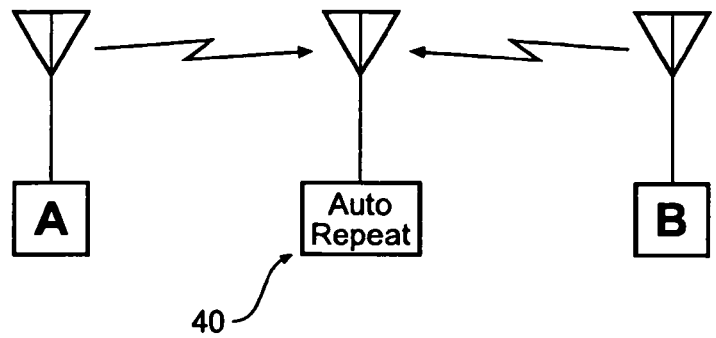
FIG. 4 shows a repeater and two transceivers disposed in a network according to the present invention.

FIG. 4 shows an example configuration of devices A and B in a network. Devices A and B are separated by a distance greater than each of their respective transmitting ranges. Thus, if device A were to transmit data as described above, device B would not receive this data and would not know how to proceed as described above. This would prevent the effective updating of a shared network variable. In accordance with an aspect of the present invention however, repeater device 40 is placed between devices A and B and acts as a repeater. Thus, if device A transmits data, repeater device 40 will receive this transmission from device A and retransmit the data such that device B will receive device A's data. When device B transmits its acknowledgement, this will be received by the repeater. The repeater in turn transmits an overall acknowledge status which will be received by both devices A and B. Both devices then know that the information was relayed by the repeater, and in turn accepted or rejected by all devices in range of the repeater. Devices A and B can then proceed in the normal manner.

Of course, device B for example need not be a transceiver/receiver but may be a transceiver/transmitter. In this case, device B will transmit information to the network however, because device A (for example a transceiver/receiver) being out of range of device B would not receive the transmitted data. Again, repeater device 40, being disposed between device A and device B, will receive the data transmitted by device B, and retransmit this data so that device A and any other devices within the range of repeater device 40 will receive the retransmission. Similarly, the acknowledgement from device A will be received by the repeater, which in turn provides an overall acknowledge status back to device B.

It will be appreciated that in practice, repeater device 40 does not need to be placed directly between two devices but may be placed in any suitable position such that devices within the network can be reached.

In some cases, it may be possible that device A will have sufficient range to reach device B however, device B, having a shorter transmission range than device A, will not be able to communicate with device A. In this case, repeater device 40 may be positioned closer to device B than to device A in order to allow transmissions from device B to reach repeater device 40 which can then be repeated and communicated to device A.

Practically, it is beneficial to construct all devices in the network in the same way. This means that each device, whether it acts as a transceiver/transmitter, transceiver/receiver or repeat device, will be constructed in the same way and can be separately enabled to perform their desired functions. This provides significant savings in the complexity and cost of manufacture since only one device need be manufactured. The particular construction of a device will be described in more detail later, with reference to FIGS. 6 and 7.

In use, if a device has been set as a repeater, upon receiving information in the first frame (see FIG. 3), the repeater will immediately transmit a repeat flag in a new second time slot and then retransmit, in a new third time slot, the data received in the first time slot. The network then operates normally as described above in that devices being transceivers/receivers that have received the retransmitted information will then proceed to acknowledge the successful or unsuccessful receipt of that data as discussed above, and the repeater will issue a final overall repeat status to inform all devices in the network of the success or failure of the repeated data.

Figure 5:
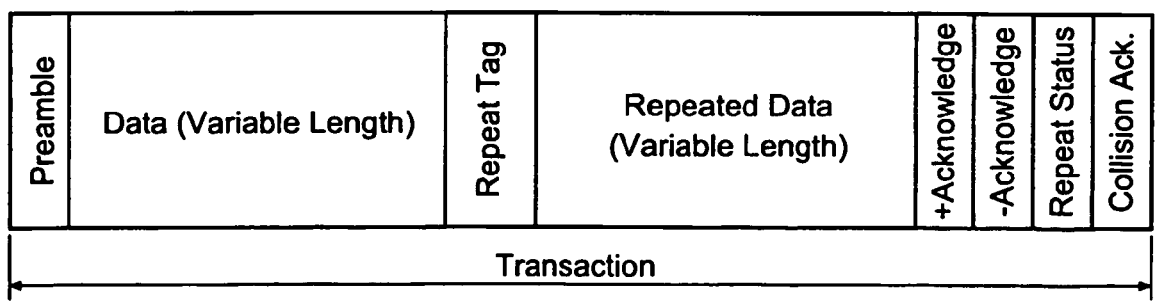
FIG. 5 shows a frame structure used in the configuration of FIG. 4.

The modified protocol frame is shown in FIG. 5. A comparison with the frame of FIG. 3 clearly shows the differences between the modified repeat tag transaction of FIG. 5 and the non-repeat tag transaction of FIG. 3. Specifically, the first time slot providing for transmission of data is present in both transaction frames however, in the repeat tag frame of FIG. 5, a second time slot is provided for the transmission of a repeat tag flag. A third time slot is provided in which the data transmitted in the first time slot is then retransmitted. An acknowledgement time slot is then provided containing a first sub-time slot for transmitting a positive acknowledge and a second sub-time slot for transmitting a negative acknowledge. Furthermore, in the repeat tag frame of FIG. 5, an additional time frame is provided for the transmission of a repeat status which provides confirmation to all devices that the transmission has been repeated.

The situation described above in relation to the repeater is complicated even further by the fact that it is possible that some devices will begin the transmission at the same time. When all devices are within range of each other, collisions can normally be dealt with easily when a system of dominant and inferior bits is used. Firstly, collisions are avoided by monitoring the transmission medium before transmitting. This leaves a small period during which simultaneous transmission can begin. In the event that two devices simultaneously begin transmission in this small period, there will inevitably be a difference in the data bits being transmitted. When this difference occurs, the device that transmits the inferior bit will detect a dominant bit due to the other transmitter, and can then cease further transmission.

The device that detects the collision reschedules its transmission for some later time. This time delay can be based on a small random number, optionally scaled by the length of the message to be transmitted.

In the case where a repeat device is used, there is a much longer delay between a device transmitting and another device receiving that transmission via the repeater.

For example, with reference again to FIG. 4, if device A begins transmitting, there will be a delay between the time repeater device 40 receives device A's transmission and the time it retransmits the transmission to be received by device B. During this time, device B may begin transmitting its own data. This new transmission will cause a collision, which is detectable at the repeater but not at device A. This situation is addressed by another aspect of the present invention.

Specifically repeat device 40 checks the data that it receives. If it detects a bit stuffing violation or a data coding violation during its reception, this indicates that devices A and B are transmitting simultaneously. Upon detection of this, repeater device 40 deliberately begins transmitting a long stream of dominant bits (for example 6 to 8 bits), which violate the normal bit stuffing or data coding rules. This will cause devices A and B to both detect a collision, and cease transmission according to normal collision detection and resolution rules as described above.

As for a normal collision, Devices A and B then each schedule a retransmission after a random time delay, optionally scaled according to the message length. The likelihood of this delay being identical for each device is very small however, should each device again begin transmitting at the same time, the delay period is recalculated, but this time, each device multiplies its respective delay period by two. For each subsequent failure, the successive delay periods are doubled up to some predetermined number of doublings. At this point, the transmission will be aborted and optionally the operator can be notified by any suitable means. In most cases however, the random delay period will result in a resolution to the conflicting transmissions and the devices of the network will be able to continue transmitting in the normal manner.

Of course, it will be appreciated that any other suitable form of re-transmission delay could be used.

As previously discussed, practically, it is beneficial to construct all devices in the network in the same way. This means that each device, whether it acts as a transceiver/transmitter, transceiver/receiver or repeat device, will be constructed in the same way and can be separately enabled to perform their desired functions. This provides significant savings in the complexity and cost of manufacture since only one type of device need be manufactured.

Figure 6:
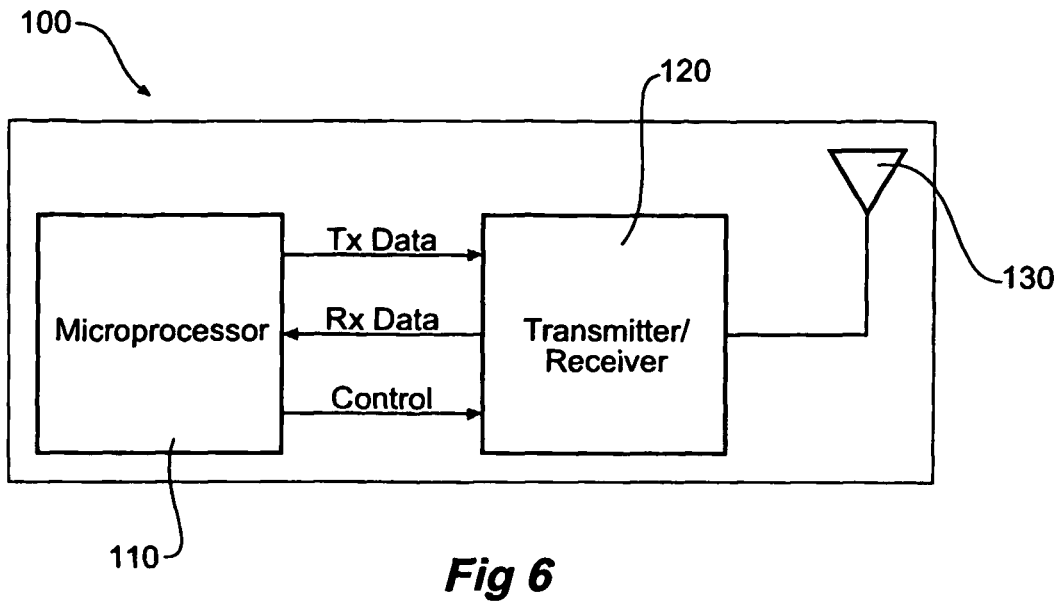
FIG. 6 shows a preferred structure of a transceiver device used in the present invention.

The preferred implementation of transceiver device 100 uses a radio receiver, a radio transmitter, and a microprocessor. These first two items can optionally be combined as a transmitter/receiver, as shown in FIG. 6, which shows device 100 including microprocessor 110 and transmitter/receiver 120. Transmitter/receiver 120 transmits and receives data via antenna 130.

It will be appreciated that use of a microprocessor is not mandatory. For example the protocol could be implemented in a dedicated integrated circuit, a programmable logic device or a programmable gate array. Using a microprocessor is convenient because it allows a readily modifiable software implementation, and reduces the overall parts count. However the software implementation is only suitable for low to moderate data rates.

The function of the transmitter/receiver 120 is to receive or transmit information. The choice of transmitter/receiver will be determined by a range of factors, including (but not limited to):

a. The regulatory environment of the market into which the product will be sold.
   Each country has regulations that determine factors including allowable frequencies, transmit power levels and bandwidth. Transmitter/receivers suitable for use in some countries may be illegal in other countries.
   For products with a broad sales appeal in a range of countries, it is possible that several different transmitter/receivers will need to be selected, appropriate to each country.
b. Power consumption, in conjunction with any other considerations that determine the amount of power available.
   For example, transmitter/receivers with a high power consumption may be unsuitable for battery operation.
c. Time for the transmitter/receiver to switch between receive and transmit modes.
   In the communication protocol of the present invention, the time to switch between receive and transmit is important, because the protocol includes a set of fixed time slices. Depending on the overall transaction being performed, a time slice may need to be received or transmitted.
   The time to switching between receive and transmit constitutes an overhead (dead time). Large switching times have the effect of wasting bandwidth.
d. Interface type.
   Many types of transmitter/receiver are available. A type that provides digital data input and output gives the simplest interface with the microprocessor.
e. Data rate.
   The transmitter/receiver needs to support a data rate appropriate to the overall product requirements. This data rate could be anywhere between extremely low or extremely high.
f. Physical size, and the amount of space available.
g. Cost.
h. Amount of design effort.

At the very least, the transmitter/receiver needs:
a. A Transmit data out+put, used by the microprocessor to place a communication state onto the wireless medium;
b. A Receive data output, used by the transceiver to indicate to the microprocessor the state of the wirelesss medium; and
c. A control input, used by the microprocessor to select a receive or transmit mode of operation of the transmitter/receiver.

Control inputs can range between very simple, and very complex. At the simplest extreme, it is used to select between receive and transmit. Some transmitter/receivers support a low power "sleep" mode. Others allow complex setup and configuration to be made for transmitter/receiver operating behaviour.

For the protocol described, the type of control input is not critical.

Some suitable transmitter/receivers include RFM ASH series TR1000 to TR3100, Chipcon CC1000 and Nordic NRF401, NRF403.

The microprocessor 110 is used to implement the communication protocol, using the transmitter/receiver as the means of placing communication states onto the wireless medium, and receiving communication states from the wireless medium.

The type and choice of microprocessor is not very critical, provided that it can perform operations with precise timing. The degree of precision only needs to be enough to avoid creating bit errors in the communication protocol.

The protocol is best implemented in a bit-oriented manner, because this allows the point at which the time slices begin to be easily recognised.

The microprocessor is responsible for implementing at least some of the following functions:
  a. A data encoding and decoding scheme used for transmission and reception—for example, Manchester coding;
  b. Recovery in the receiver of the transmitted clock—for example by synchronising onto a preamble;
  c. Detection of collisions;
  d. Creation of each time slot, and appropriate transmission or reception during the time slice to exchange the relevant acknowledge information;
  e. Implementation of an error detection scheme that can be used by a receiving device to determine if a transmission is received with or without error;
  f. Implementation of an error correction scheme that can be used by a receiving device to correct for some number of received errors during a transmission; and
  g. Adding a repeater function that can be used to change the structure of the transaction, allowing the information packet to be repeated for the purpose of extending the range.

Figure 7:
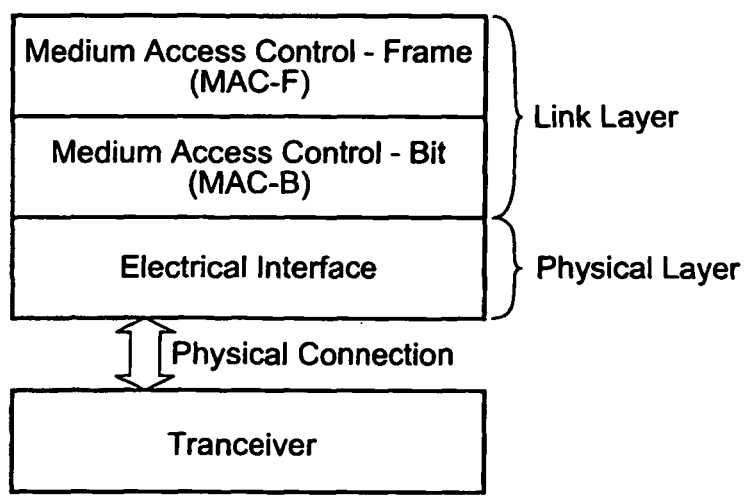
FIG. 7 shows parts of the ISO 7 layer model in which certain functions of the transceiver device of FIG. 6 are performed.

As previously described, a common method for describing the functions used in communication protocols is the ISO 7 layer model. Whilst a software structure based on this model is not mandatory, its use simplifies the overall design. Using this model, the functions performed in the bottom few layers are shown in FIG. 7.

The microprocessor hardware provides the electrical interface (Physical layer), while the microprocessor software performs the functions of all higher layers.

In particular, the software MAC-B portion of the Link Layer is responsible for all time-critical functions of data transmission and reception, including at least some of the following:
  a. Starting a new transmission (including generation of any preamble);
  b. Transmitting data bits;
  c. Transmitting frame markers;
  d. Starting reception;
  e. Synchronisation onto the transmitted data stream and clock recovery;
  f. Reception and decoding of data bits;
  g. Reception and decoding of frame markers;
  h. Detection of a collision;
  i. Starting each time slice; and
  j. Transmission or reception of data bits inside a time slice.

The software MAC-F portion of the Link Layer is not so time critical. It is responsible for higher level message-oriented processing, including at least some of:
  a. Construction of a packet from received data bits;
  b. Packet error checking;
  c. Determination of when to acknowledge, and the type of acknowledgement to be generated (using the time slice services of MAC-B);
  d. (optionally) Based on packet structure, scheduling the operation of a repeated transmission
  e. Starting the transmission of a new packet;
  f. Generation of packet error-check sequences;
  g. Transmission of a packet, bit at a time;
  h. Examination of acknowledgements, and collisions, and determination of whether a packet should be re-transmitted and when that re-transmission should occur.

Many different microprocessors are available. Some have special hardware functions available which remove some of the processor load for time critical functions, such as generation of time intervals, generation of pulses, and so on. Whilst these hardware functions are not mandatory, their use greatly simplifies the software design and coding.

Some microprocessors that are suitable for use in this invention include the Texas Instruments MSP430 family, Atmel Atmega family and the Hitachi H8/3644 family.

A useful feature of an aspect of the present invention relates to the accurate detection of the end of the variable length time slice containing the data transmitted by the transceiver/transmitter.

It is desirable for communication media to require some form of balanced transmission to avoid accumulation of a dc offset. This balance requires that the number of ON and OFF states on the medium be equal, when considered over a moderate to long time period.

There are a number of encoding schemes that can be used to translate the data bits into states on the medium. These vary in terms of the bandwidth they consume on the medium, and the ease of recovery of the transmitted data in a receiver.

One of the most common is Manchester coding. This coding uses two states on the medium for each data bit, and has a simple process for data recovery in the receiver. This codes a 1 bit as the state pair (OFF, ON), and a 0 bit as the state pair (ON, OFF).

The Manchester code always has a state transition (OFF to ON, or ON to OFF) in the middle of each data bit which greatly simplifies the process in the receiver of data recovery and synchronisation onto the transmitter clock.

In the Manchester code, the state pairs (OFF, OFF and ON, ON) are not permitted.

The Manchester code can be exploited, so that the illegal state pairs are used to convey information about points of significance.

The exact choice of the illegal state sequence is not very important, so long as it is used consistently. Preferably, the dc balance of the Manchester coding should be preserved.

A suitable coding to represent the end of the variable portion of the transmission is to use a simple illegal sequence: (ON, ON, OFF, OFF). This preserves the dc balance, and can be easily recognised by the Manchester decoder.

If additional information needs to be conveyed, this sequence can be used as a "lead-in". So, for example, other possible sequences might be:
  (ON, ON, OFF, OFF, ON, OFF)=first point of significance
  (ON, ON, OFF, OFF, OFF, ON)=second point of significance When the methods and advantages are considered together, the preferred protocol implementation is bit-oriented, synchronous, and exploits illegal coding to denote points of significance in the variable part.

This has the advantage of providing a high level of time-based precision in finding the end of the variable portion, is relatively easy to implement, and does not need escape sequences or bit-stuffing. Furthermore, the high time-based precision in finding the end of the variable portion also creates a high level of precision in determining the start of the fixed time slots that follow.

The fixed time slices are easily transmitted, simply by counting the transmitted states or bits. The received time slices require a Manchester decoder (without the need to support the illegal states), and a timer in the case where nothing is transmitted during the period of the received time slice.

It will be understood that the above has been described with reference to a preferred embodiment and that many variations and modifications may be made within the scope of the present invention.

The invention claimed is:

1. A method for use in a radio communication system comprising a first transceiver, at least two other transceivers and a repeater, the method comprising:
upon receiving data from the first transceiver, transmitting, by the repeater, a repeat flag to cause the first transceiver and the at least two other transceivers to suspend further action, then transmitting, by the repeater, the data received from the first transceiver, and then transmitting, by the repeater, an overall acknowledge status to inform all transceivers in the system of the success or failure of receipt of the data transmitted by the repeater.

2. A method according to claim 1, wherein each of the at least two other transceivers transmit an acknowledgement indicating the successful or unsuccessful receipt of the data transmitted by the repeater.

3. A method according to claim 2, wherein the overall acknowledge status is transmitted after receipt of the acknowledgements from each of the at least two other transceivers, and the overall acknowledge status is based upon the received acknowledgements.

4. A method for transmitting and receiving data according to a frame for use in a network of devices comprising a first transceiver, a repeater, and at least two other transceivers, the method comprising:
transmitting, by the first transceiver, data for each of the at least two other transceivers in a first time slot of the frame;
transmitting, by the repeater, a repeat flag in a second time slot of the frame after the first time slot;
retransmitting, by the repeater, the data transmitted in the first time slot in a third time slot of the frame, after the second time slot; and
transmitting, by the repeater, an overall acknowledge status to the network in a last time slot after the third time slot to inform all transceivers in the network of the success or failure of receipt of the retransmitted data.

5. A method according to claim 4, further comprising transmitting, by each of the at least two other transceivers, in a fourth time slot of the frame, after the third time slot and before the last time slot, an acknowledgement of a successful or unsuccessful receipt of the data.

6. A method according to claim 5, wherein the fourth time slot of the frame is divided into a first sub-time slot for indicating a positive acknowledgement, and a second sub-time slot for indicating a negative acknowledge.

7. A method according to claim 6, in which the first and third time slots of the frame are variable in length and the first and second sub-time slots are fixed in length.

8. A method according to claim 7, wherein the last time slot for transmitting an overall acknowledge status to the network is a fifth time slot after the fourth time slot, and the overall acknowledge status is based upon the acknowledgements received in the fourth time slot.

9. A method according to claim 6, wherein the positive acknowledge comprises the transmission of a specific coded value containing sufficient redundancy to allow it to be recovered in the presence of received errors, and the negative acknowledge comprises the transmission of a specific coded value containing sufficient redundancy to allow it to be recovered in the presence of received errors.

10. A radio communication system comprising a first transceiver, at least two other transceivers and a repeater, wherein upon receiving data from the first transceiver in a first time slot, the repeater transmits a repeat flag in a second time slot to cause the transceivers to suspend further action, then in a third time slot transmits the data received in the first time slot, and transmits an overall acknowledge status to all transceivers in a last time slot after the third time slot to inform all transceivers in the system of the success or failure of receipt of the data transmitted by the repeater.

11. A radio communication system according to claim 10, wherein each of the at least two other transceivers transmit, in a fourth time slot before the last time slot, an acknowledgement indicating the successful or unsuccessful receipt of the data transmitted in the third time slot.

12. A radio communication system according to claim 11, wherein each of the at least two other transceivers transmit a positive acknowledge in a first of two sub-time slots of the fourth time slot or transmit a negative acknowledge in a second of two sub-time slots of the fourth time slot.

13. A radio communication system according to claim 11, wherein the last time slot is a fifth time slot after the fourth time slot, and the overall acknowledge status is based upon the acknowledgements received in the fourth time slot.

14. A repeater for use in a radio communication system comprising at least three transceivers, wherein upon receiving data in a first time slot, the repeater transmits a repeat flag in a second time slot to cause the transceivers to suspend further action, then transmits in a third time slot, data received in the first time slot, and then transmits in a last time slot, after the third time slot, an overall acknowledge status to inform each of the transceivers of the success or failure of receipt of the data transmitted by the repeater.

15. A repeater according to claim 14, wherein upon receiving acknowledgement data from the at least three transceivers in a fourth time slot, the repeater transmits an overall acknowledge status as the overall status in a fifth time slot.

16. A transceiver for use in a radio communication system comprising at least two other transceivers and a repeater, wherein upon receiving a repeat flag from the repeater, in a second time slot, the transceiver suspends further action until it receives from the repeater, in a third time slot, data that was originally transmitted by the at least two other transceivers in a first time slot, before the second time slot, and an overall acknowledge status from the repeater in a last time slot, after the third time slot, after which the transceiver resumes normal action, wherein the overall acknowledge status informs each of the transceivers of the success or failure of receipt of the data from the repeater.

17. A transceiver according to claim 16, wherein in a fourth time slot after the third time slot and before the last time slot, the transceiver transmits an acknowledgement indicating the successful or unsuccessful receipt of the data transmitted in the third time slot.

18. A transceiver according to claim 17, wherein the transceiver transmits a positive acknowledge in a first of two sub-time slots of the fourth time slot, or transmits a negative acknowledge in a second of two sub-time slots of the fourth time slot.

* * * * *